United States Patent
Çanak et al.

(10) Patent No.: US 11,140,272 B2
(45) Date of Patent: Oct. 5, 2021

(54) SYSTEM FOR DETERMINING WHETHER MOBILE SUBSCRIBERS ARE LINE HOLDERS OR NOT

(71) Applicant: TURKCELL TEKNOLOJİ ARASTIRMA VE GELİSTİRME ANONİM SİRKETİ, Istanbul (TR)

(72) Inventors: Caner Çanak, Istanbul (TR); Onur Öneş, Kocaeli (TR)

(73) Assignee: TURKCELL TEKNOLOJI ARASTIRMA VE GELISTIRME ANONIM SIRKETI, Istanbul (TR)

(*) Notice: Subject to any disclaimer, the term of this patent is extended or adjusted under 35 U.S.C. 154(b) by 47 days.

(21) Appl. No.: 16/468,857

(22) PCT Filed: Dec. 11, 2017

(86) PCT No.: PCT/TR2017/000134
§ 371 (c)(1),
(2) Date: Jun. 12, 2019

(87) PCT Pub. No.: WO2018/203840
PCT Pub. Date: Nov. 8, 2018

(65) Prior Publication Data
US 2019/0320072 A1    Oct. 17, 2019

(30) Foreign Application Priority Data

Dec. 12, 2016 (TR) .................................. 2016/18313

(51) Int. Cl.
*H04M 15/00* (2006.01)
*H04W 8/18* (2009.01)

(52) U.S. Cl.
CPC ......... *H04M 15/755* (2013.01); *H04M 15/58* (2013.01); *H04M 15/61* (2013.01); *H04M 15/725* (2013.01); *H04M 15/7652* (2013.01); *H04W 8/18* (2013.01)

(58) Field of Classification Search
CPC .... H04M 15/755; H04M 15/58; H04M 15/61; H04M 15/725; H04M 15/7652; H04W 8/18; H04L 41/0893; H04L 43/0876
See application file for complete search history.

(56) References Cited

U.S. PATENT DOCUMENTS 5,850,435 A * 12/1998 Devillier ............... H04M 1/578
                                                    379/374.02
5,991,364 A * 11/1999 McAllister ........ H04M 3/42204
                                                       379/229
9,516,053 B1 * 12/2016 Muddu ............... H04L 63/1433
(Continued)

OTHER PUBLICATIONS

International Search Report in International Application No. PCT/TR2017/000134.
(Continued)

*Primary Examiner* — Mazda Sabouri
(74) *Attorney, Agent, or Firm* — Ladas & Parry LLP

(57) ABSTRACT

The present invention relates to a system for determining whether subscribers of mobile network operators are line holders for the line being used by them or not. The data collection unit, the data interpretation unit, the learning unit, the estimation unit and the database are included within the inventive system.

20 Claims, 1 Drawing Sheet

(56) References Cited

U.S. PATENT DOCUMENTS

| | | | | |
|---|---|---|---|---|
| 2005/0286686 A1* | 12/2005 | Krstulich | ........... | G06Q 30/0284 379/32.01 |
| 2013/0247224 A1* | 9/2013 | Karlson | ................ | H04W 12/08 726/28 |
| 2015/0347725 A1* | 12/2015 | Ben Ari | .................. | G06F 21/31 726/19 |
| 2017/0195489 A1* | 7/2017 | Liu | ....................... | H04M 3/527 |

OTHER PUBLICATIONS

Written Opinion of the International Search Authority in International Application No. PCT/TR2017/000134.

\* cited by examiner

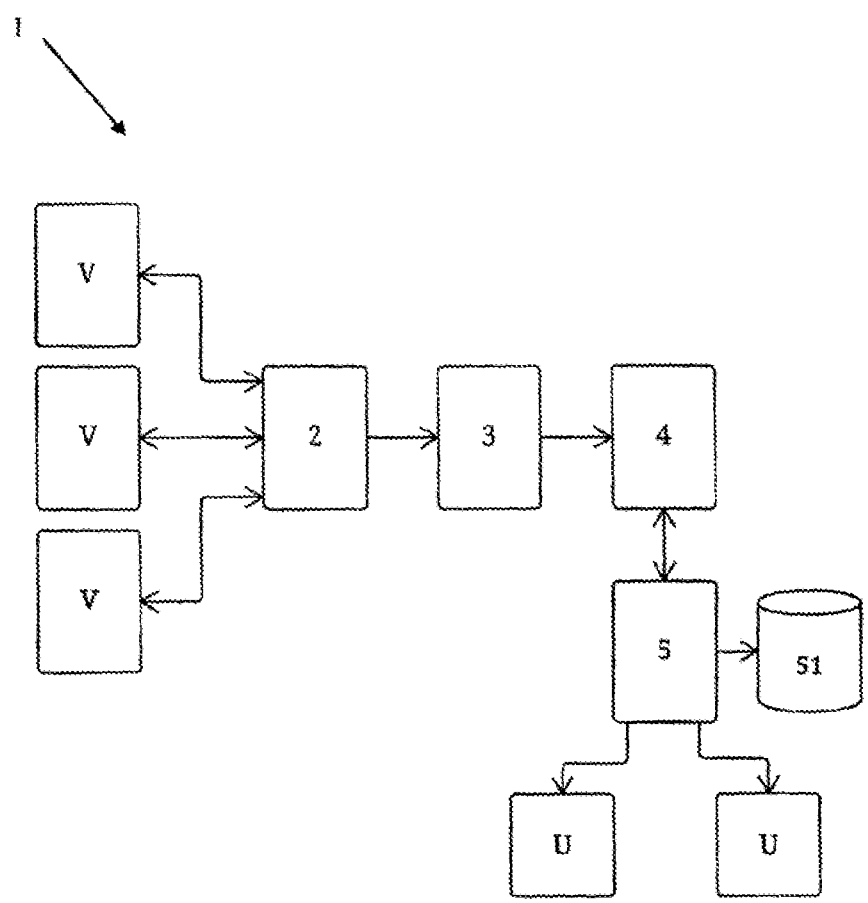

SYSTEM FOR DETERMINING WHETHER MOBILE SUBSCRIBERS ARE LINE HOLDERS OR NOT

RELATED APPLICATION

This application is an application, under 35 U.S.C. 371 of International Application No. PCT/TR2017/000134 filed on 11 Dec. 2017, which claims priority from Turkish Application No. 2016/18313 filed on 12 Dec. 2016, the disclosures of which are incorporated in their entirety by reference herein.

TECHNICAL FIELD

The present invention relates to a system for determining whether subscribers of mobile network operators are line holders for the line being used by them or not.

BACKGROUND OF THE INVENTION

Today, subscribers of mobile network operators do not use the lines registered to their names in all cases and they can sometimes use the lines registered to another person (for example, another family member). This case causes the fact that the line user and the line holders art different for subscribers of mobile network operators.

In the present technique, determining whether a mobile subscriber in user status is only a line user or a line holder as well causes a difficult process to be experienced by mobile network operators and requires laborious works to be performed. Although it is tried to determine whether the mobile subscriber is only a line user or a line holder as well by means of works such as conducting survey, sending messages to subscribers from various channels, making calls, providing benefit to subscribers in some cases where personal information are filled in; these works are included in the state of the art as costly works with very low rate of return for reliable data due to reasons such as the fact that data cannot be received from all subscribers, transaction of data acquisition is laborious, the received data are based on declaration of subscribers.

Determining whether subscribers of mobile network operators are line users or actually line holders is a determination which has critical importance in terms of mobile network operators for knowing the subscriber better and adjusting the services to be provided and recommended to the subscriber accordingly. When laborious methods for determining, this information is taken into account in the state of the art, together with importance and criticality of this determination, it is understood that a more effective solution that will serve to determine whether the mobile subscriber is line holder or not is necessary in the state of the art.

The Chinese patent document no. CN103428370, an application in the state of the art, discloses a method for determining whether a mobile phone has multiple users or not. In the method, it is detected whether the user is line holder or not by comparing the user information wherein the mobile device is registered with the SIM card information being used in the mobile device.

The United States patent document no. U.S. Pat. No. 5,623,539, another application in the state of the art, discloses a system for detecting users of phone lines by sound analysis.

SUMMARY OF THE INVENTION

Objective of the present invention is to realize a system for determining whether subscribers of mobile network operators are line holders for the line being used by them or not on the basis of the data obtained from the subscribers' usage of mobile, fixed network and value-added services.

DETAILED DESCRIPTION OF THE INVENTION

"A System for Determining Whether Mobile Subscribers are Line Holders or Not" realized to fulfill the objective of the present invention is shown in the FIGURE attached, in which:

FIG. 1 is a schematic view of the inventive system.

The components illustrated in the FIGURE are individually numbered, where the numbers refer to the following:
1. System
2. Data collection unit
3. Data interpretation unit
4. Learning unit
5. Estimation unit
   51. Database
V. Data source
U. Terminal systems The inventive system for determining whether mobile subscribers are line holders or not (1) comprises:
- at least one data collection unit (2) which collects data about subscribers' usages of mobile network, fixed network and value-added services from different data sources (V);
- at least one data interpretation unit (3) whereto the data collected by the data collection unit (2) are transferred and which enriches the data by carrying out summarization and interpretation transactions on these data and generates meaningful variables for each subscriber;
- at least one data learning unit (4) which carries out learning transaction by means of machine learning methods on the data of the type determined by the data interpretation unit (3) and generates an estimation method;
- at least one estimation unit (5) which realizes an estimation about whether the subscribers are line holders or not by running the model generated by the data learning unit (4) for the subscribers and can transfer the estimation results to various terminal systems (U);
- at least one database (51) which keeps the data about the estimations managed by the estimation unit (5) and realized by the estimation unit (5) (FIG. 1)

The data collection unit (2) is a unit which collects data about subscribers' usages of mobile network, fixed network and value-added services from different data sources (V) and carries out summarization and interpretation transactions on these data.

In preferred embodiment of the invention, the data collected by the data collection unit (2) from data sources (V) are history of network performance indicators; location history of subscribers that emerge with their signaling and call detail information occurring by their mobile network usages; data about their mobile data usages; data of TV and entertainment usage and purchase that is received from fixed and mobile network system; history of music usage; data about data usages performed over fixed networks; information of the mobile device that is used by the subscriber; data about club, classification, membership information of the subscribers on the mobile network operator.

The data interpretation unit (3) is a unit whereto the data collected by the data collection unit (2) are transferred and which enriches the data by carrying out summarization and interpretation transactions on these data and generates meaningful variables for each subscriber.

In one embodiment of the invention, the data interpretation unit (3) determines POI (Point-of-Interest) information (such as university, hospital, plaza, AVM, concert, stadium) over the location history collected by the data collection unit (2) and enriches these location information. Similarly, the data interpretation unit (3) analyses the data about the mobile data usage collected by the data collection unit (2) and the data about the data usages realized over the fixed networks and determines over which applications or sites these data usages are realized by exhibiting fields of these applications and sites (such as game, social media, health, music). Thus, the said data usage data are enriched.

The data learning unit (4) is a unit which carries out learning transaction by means of machine learning methods on the data whereon the data interpretation unit (3) carries out summarization and interpretation transactions and the variables generated by it and creates an estimation model.

In preferred embodiment of the invention, the data learning unit (4) carries out learning transaction by means of regression method which is one of machine learning methods.

The data learning unit (4) is a unit which periodically realizes learning and model development applications in preferred embodiment of the invention. Thus, it is ensured that the estimation model is updated together with new data occurred in time and new variables generated.

The estimation unit (5) is a unit which realizes an estimation about whether the subscribers are line holders or not by running the model generated by the data learning unit (4) for the subscribers and can transfer the estimation results to various terminal systems (U) such as marketing, planning systems.

The estimation unit (5) can runs the said model for all subscribers in one embodiment of the invention whereas it can run the model for a certain group of subscribers as well. The said subscriber groups, in different embodiments of the invention, can be subscriber groups such as subscribers changing tariff/bill, new subscribers, subscribers realizing new service purchase, subscribers experiencing/realizing change of classification/club/membership, subscribers changing device, subscribers whose data on the HLR (Home Location Register) changes.

The estimation unit (5) is also a unit which has the quality to realize the estimation transaction again for all subscribers or one or several subscriber group in the event that the estimation model changes/is updated as a result of the transactions realized by the data learning unit (4).

In one embodiment of the invention, the estimation unit (5) is a unit which has the quality to test the model created by the data learning unit (4) by using a control data and to determine whether the model has exceeded the correct estimation threshold value or not.

The database (51) is a unit which keeps the data about the estimations managed by the estimation unit (5) and realized by the estimation unit (5).

With the inventive system (1), transaction of determining whether subscribers of mobile network operators are line holders for the line being used by them or not on the basis of the data obtained from the subscribers' usage of mobile, fixed network and value-added services is carried out. When the said transaction is carried out, firstly the data collection unit (2) collects data about subscribers' usages of mobile network, fixed network and value-added services from various data sources (V). Then, the data interpretation unit (3) enriches suitable data by carrying out summarization, interpretation transactions on these data received by the data collection unit (2). Thus, a large number of variables whereon analysis can be made are created specific to each subscriber. The data learning unit (4) carries out learning transaction by means of machine learning methods and it creates an estimation model for determining whether a line being used by a subscriber is a line holder or not, on the data wherein the data interpretation unit (3) carries out summarization and interpretation transaction and the variables generated by it, based on the information of whether the subscriber is line holder or not for the cases in these said data. In one embodiment of the invention, this model is a model wherein environmental factors are also taken into account together with information of calling/being called and information of social network analysis. This model is tested by the estimation unit (5) at first and if it is detected to have exceeded a certain estimation threshold value, it is started to be used for all subscribers or a selected subscriber group by the estimation unit (5) for the purpose of determining whether the subscribers are line holders or only line users according to the usage data and thus it is determined whether the subscribers are holders or users of the line being used by them. The estimation unit (5) is a unit which has the quality to transfer estimation results to different terminal systems (U) and also to write them to a database (51).

Within these basic concepts; it is possible to develop various embodiments of the inventive system (1), the invention cannot be limited to examples disclosed herein and it is essentially according to claims.

The invention claimed is:

1. A system (1) for determining whether mobile subscribers are line holders or not, comprising at least one data collector (2) which collects data about subscribers' usages of a mobile network, a fixed network, and value-added services from different data sources; the system further comprising:
   at least one estimator (5) which realizes an estimation about whether the subscribers are line holders or not by running a model generated by a data learner (4) for the subscribers and can transfer the estimation results to various terminal systems;
   at least one database (51) which stores data about the estimations managed by the estimator (5) and realized by the estimator (5);
   at least one data interpreter (3) whereto the data collected by the data collector (2) are transferred and which enriches the data by carrying out summarization and interpretation transactions on the data and generates meaningful variables for each subscriber;
   at least one data learner (4) which carries out a learning transaction by means of machine learning methods on the data of the type determined by the data interpreter (3) and generates an estimation method.

2. A system (1) according to claim 1; wherein the data collector (2) collects history of network performance indicators; location history of subscribers that emerge with their signaling and call detail information occurring by their mobile network usages; data about their mobile data usages; data of TV and entertainment usage and purchase that is received from fixed and mobile network systems; history of music usage; data about data usages performed over fixed networks; information of the mobile device that is used by the subscriber; data about club, classification, membership information of the subscribers on the mobile network operator from data sources.

3. A system (1) according to claim 1; wherein the data interpreter (3) determines POI (Point-of-Interest) information over the location history collected by the data collector (2) and enriches these location information.

4. A system (1) according to claim 1; wherein the data interpreter (3) analyzes the data about the mobile data usage collected by the data collector (2) and the data about the data usages realized over the fixed networks and determines over which applications or sites these data usages are realized by exhibiting fields of these applications and sites.

5. A system (1) according to claim 1; wherein the data learner (4) carries out the learning transaction by means of a regression method that is one of machine learning methods.

6. A system (1) according to claim 1; wherein the data learner (4) periodically realizes learning and model development applications.

7. A system (1) according to claim 1; wherein the estimator (5) has the quality to run the estimation model for all subscribers or a certain group of subscribers.

8. A system (1) according to claim 1; wherein the estimator (5) has the quality to realize an estimation transaction again for all subscribers or one or several subscriber groups in the event that the estimation model changes/is updated as a result of the transactions realized by the data learner (4).

9. A system (1) according to claim 1; wherein the estimator (5) has the quality to test the model created by the data learner (4) by using a control data and to determine whether the model has exceeded a correct estimation threshold value or not.

10. A system (1) according to claim 1; wherein the data learner (4) creates an estimation model wherein environmental factors are also taken into account together with information of calling/being called and information of social network analysis.

11. A method for determining whether mobile subscribers are line holders or not, comprising:
 collecting in at least one data collector (2) data about subscribers' usages of a mobile network, a fixed network, and value-added services from different data sources;
 estimating by at least one estimator (5) an estimation about whether the subscribers are line holders or not by running a model generated by a data learner (4) for the subscribers and transferring the estimation results to various terminal systems;
 storing in at least one database (51) data about the estimations;
 transferring into at least one data interpreter (3) the data collected by the data collector (2) and enriching the data by carrying out summarization and interpretation transactions on the data and generating meaningful variables for each subscriber;
 carrying out by at least one data learner (4) a learning transaction by means of machine learning methods on the data of the type determined by the data interpreter (3) and generating an estimation method.

12. A method according to claim 11; wherein the collecting step further comprises collecting history of network performance indicators; location history of subscribers that emerge with their signaling and call detail information occurring by their mobile network usages; data about their mobile data usages; data of TV and entertainment usage and purchase that is received from fixed and mobile network systems; history of music usage; data about data usages performed over fixed networks; information of the mobile device that is used by the subscriber; data about club, classification, membership information of the subscribers on the mobile network operator from data sources.

13. A method according to claim 11; further comprising determining by the data interpreter (3) POI (Point-of-Interest) information over the location history collected by the data collector (2) and enriching these location information.

14. A method according to claim 11; further comprising analyzing by the data interpreter (3) the data about the mobile data usage collected by the data collector (2) and the data about the data usages realized over the fixed networks and determining over which applications or sites these data usages are realized by exhibiting fields of these applications and sites.

15. A method according to claim 11; further comprising carrying out by the data learner (4) the learning transaction by means of a regression method that is one of machine learning methods.

16. A method according to claim 11; wherein the data learner (4) periodically realizes learning and model development applications.

17. A method according to claim 11; wherein the estimator (5) has the quality to run the estimation model for all subscribers or a certain group of subscribers.

18. A method according to claim 11; wherein the estimator (5) has the quality to realize the estimation transaction again for all subscribers or one or several subscriber groups in the event that the estimation model changes/is updated as a result of the transactions realized by the data learner (4).

19. A method according to claim 11; wherein the estimator (5) has the quality to test the model created by the data learner (4) by using a control data and to determine whether the model has exceeded the correct estimation threshold value or not.

20. A method according to claim 11; wherein the data learner (4) creates an estimation model wherein environmental factors are also taken into account together with information of calling/being called and information of social network analysis.

* * * * *